United States Patent
Oh et al.

(10) Patent No.: US 8,817,216 B2
(45) Date of Patent: Aug. 26, 2014

(54) LIQUID CRYSTAL DISPLAY DEVICE WITH A BUILT-IN TOUCH SCREEN AND METHOD FOR MANUFACTURING THE SAME

(75) Inventors: Kum Mi Oh, Seoul (KR); Han Seok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 284 days.

(21) Appl. No.: 13/198,138

(22) Filed: Aug. 4, 2011

(65) Prior Publication Data

US 2012/0069257 A1  Mar. 22, 2012

(30) Foreign Application Priority Data

Sep. 20, 2010  (KR) .................. 10-2010-0092368

(51) Int. Cl.
*G02F 1/1335* (2006.01)
*G02F 1/133* (2006.01)

(52) U.S. Cl.
USPC ............... 349/147; 349/12; 349/16; 349/138; 349/141

(58) Field of Classification Search
USPC .................. 349/15, 12, 16, 138, 141, 147
See application file for complete search history.

(56) References Cited

U.S. PATENT DOCUMENTS

| | | | |
|---|---|---|---|
| 2006/0214168 A1* | 9/2006 | Akimoto et al. ................ | 257/59 |
| 2008/0239179 A1 | 10/2008 | Kasai | |
| 2009/0296037 A1 | 12/2009 | Tanaka et al. | |
| 2010/0193257 A1* | 8/2010 | Hotelling et al. .......... | 178/18.06 |
| 2011/0163996 A1 | 7/2011 | Wassvik et al. | |

FOREIGN PATENT DOCUMENTS

| | | |
|---|---|---|
| TW | 200849212 A | 12/2008 |
| TW | 201001258 A | 1/2010 |

OTHER PUBLICATIONS

EP Search Report dated Dec. 13, 2011, related to corresponding European patent application.
Office Action dated Mar. 20, 2014, issued by the Taiwan Intellectual Property Office in Taiwanese Patent Application No. 100128394.

* cited by examiner

*Primary Examiner* — Lauren Nguyen
(74) *Attorney, Agent, or Firm* — Morgan, Lewis & Bockius LLP

(57) ABSTRACT

A liquid crystal display device with a built-in touch screen comprising a substrate having a pixel region, a thin film transistor formed at the pixel region, the thin film transistor including at least an active layer, a gate electrode, an insulating layer, and a data electrode, a first passivation layer formed on the thin film transistor, a first contact hole formed through a portion of the first passivation layer to expose the data electrode, a common electrode formed on at least one portion of the first passivation layer including inside the first contact hole, the common electrode operable to sense touch, a conductive line formed on at least one portion of the first passivation layer including inside the first contact hole, a second passivation layer formed on the common electrode and the conductive line, a second contact hole formed through a portion of the second passivation layer to expose the conductive line corresponding to the data electrode, and a pixel electrode electrically connected with the conductive line, the pixel electrode formed on the second passivation layer and inside the second contact hole, wherein the data electrode and the pixel electrode are electrically connected via the common electrode and the conductive line.

8 Claims, 7 Drawing Sheets

| Mask | Layer |
|---|---|
| 1 | Light shield |
| 2 | Active |
| 3 | Gate |
| 4 | ILD & contact |
| 5 | Data line(S/D) |
| 6 | PAS0, PAS1 |
| 7 | Vcom |
| 8 | 3rd Metal |
| 9 | PAS2 |
| 10 | Pixel ITO |

FIG.5

| Mask | Layer |
|---|---|
| 1 | Light shield |
| 2 | Active |
| 3 | Gate |
| 4 | ILD & contact |
| 5 | Data line(S/D) |
| 6 | PAS1 |
| 7 | Vcom & 3rd Metal |
| 8 | PAS2 |
| 9 | Pixel ITO |

LIQUID CRYSTAL DISPLAY DEVICE WITH A BUILT-IN TOUCH SCREEN AND METHOD FOR MANUFACTURING THE SAME

CROSS REFERENCE TO RELATED APPLICATIONS

This application claims the benefit of the Korean Patent Application No. 10-2010-0092368 filed on Sep. 20, 2010, which is hereby incorporated by reference as if fully set forth herein.

BACKGROUND OF THE INVENTION

1. Field of the Invention

The present invention relates to a flat panel display device, and more particularly, a liquid crystal display device with a built-in touch screen, which enhances driving performance, and reduces manufacturing costs by a simplified manufacturing process, and a method for manufacturing the same.

2. Discussion of the Related Art

Recent developments in various mobile electronic equipment such as mobile terminal and notebook computer has increased the demand for an applicable flat panel display device.

The flat panel display device may include a liquid crystal display device (LCD), a plasma display panel (PDP), a field emission display device (FED), a light-emitting diode display device (LED), and etc. Among the various flat panel display devices, the LCD device is widely used owing to various advantages, for example, technical development for mass production, ease of driving means, low power consumption, high-quality resolution, and large-sized screen.

Instead of using a related art mouse or keyboard used as an input device, a touch screen recently has been used as a new input device for the flat panel display device, wherein the touch screen enables a user to directly input information by the use of finger or pen.

The touch screen has been widely applied in various fields, for example, mobile terminals such as navigation, terminals for industrial use, notebook computer, automatic teller machine (ATM), mobile phone, MP3, PDA, PMP, PSP, mobile game machine, DMB receiver, and tablet PC; and electric appliances such as refrigerator, microwave oven, and washing machine. Furthermore, an easy operational method of the touch screen rapidly enlarges the application field.

Research and development of a slim flat panel display device, such as an LCD device with a built-in touch screen has occurred. Especially, an in-cell touch type LCD device has been most actively researched and developed, wherein the in-cell touch type LCD device refers to an LCD device which uses an element existing in the related art structure, for example, a common electrode on a lower substrate, as a touch-sensing electrode.

FIG. 1 illustrates an LCD device with a built-in touch screen according to the related art, and a method for driving the same.

Referring to FIG. 1, the LCD device with a built-in touch screen according to the related art comprises lower and upper substrates 50 and 60 bonded to each other with a liquid crystal layer (not shown) interposed therebetween.

On the upper substrate 60, there are a black matrix 62; red, green, and blue color filters 64R, 64G, and 64B; and an overcoat layer 66. In this case, the black matrix 62 defines a pixel region corresponding to each of plural pixels. Also, the red, green, and blue color filters 64R, 64G, and 64B are respectively formed in the respective pixel regions defined by the black matrix 62. The overcoat layer 66 covers the red, green, and blue color filters 64R, 64G, and 64B and the black matrix 62, to thereby planarize the upper substrate 60.

On the lower substrate 50, there is a pixel array 40 including plural pixels to drive the liquid crystal layer and detect a touching point by finger or pen.

Each of the plural pixels is defined by gate and data lines crossing each other. At the crossing portion of the gate and data lines, there is a thin film transistor (hereinafter, referred to as 'TFT'). Each of the plural pixels includes a common electrode and a pixel electrode.

FIG. 2 is a cross section view illustrating a lower substrate in the LCD device with a built-in touch screen according to the related art. FIG. 2 shows a lower substrate in a fringe field switch (FFS) mode.

Referring to FIG. 2, each pixel of the lower substrate 50 is formed on a glass substrate. Each pixel includes a light-shielding layer 71 for preventing incident light; a buffer layer 51 on the light-shielding layer 71; an active layer 72 on the buffer layer 51; a gate insulating layer 52 on the active layer 72; and a gate electrode 73 of a metal material on the gate insulating layer 52, wherein the gate electrode 73 is partially overlapped with the active layer 72.

There are an interlayer dielectric (ILD) 53 and a data electrode 74. The interlayer dielectric 53 is formed on the gate electrode 73, to thereby insulate the gate electrode 73 from the data electrode 74. The data electrode 74 is electrically connected with the active layer 72, wherein the active layer 72 is partially exposed by a contact hole formed by etching the gate insulating layer 52 and the interlayer dielectric 53.

At this time, the data electrode 74 is formed by burying a metal material in the contact hole exposing some portions of the active layer 72. The data electrode 74 is electrically connected with a pixel electrode 77.

In each pixel of the lower substrate 50, there are a first passivation layer (PAS0) 54, a second passivation layer (PAS1) 55, and a common electrode 75 sequentially formed on the interlayer dielectric 53. The first and second passivation layers (PAS0, PAS1) 54 and 55 are formed to cover the gate electrode 71 and the data electrode 74. The common electrode 75 is formed on the second passivation layer 55, wherein the common electrode 75 is formed of a transparent conductive material such as Indium-Tin-Oxide (ITO).

In each pixel of the lower substrate 50, there are a conductive line ($3^{rd}$ metal) 76, a third passivation layer (PAS2) 56, and the pixel electrode 77. The conductive line 76 is formed on and electrically connected with a predetermined portion of the common electrode 75. The third passivation layer 56 is formed to cover the common electrode 75 and the conductive line 76. The pixel electrode 77 is electrically connected with an upper portion of the third passivation layer 56 and the data electrode 74, wherein the pixel electrode 77 is formed of a transparent conductive material.

The contact hole is formed by partially etching the first, second and third passivation layers (PAS0, PAS1, and PAS2) 54, 55 and 56. Through the contact hole, the upper portion of the data electrode 74 is exposed.

In this case, a predetermined portion of the second passivation layer (PAS1) 55, which is formed on the first passivation layer (PAS0) 54, is first etched, and then predetermined portions of the first and third passivation layers (PAS0, PAS2) 54 and 56 are etched at the same time, to thereby expose the upper portion of the gate electrode 74

The pixel electrode 77 is formed inside the contact hole formed by etching the first, second, and third passivation layers (PAS0, PAS1, PAS2) 54, 55 and 56, as well as on the third passivation layer 56. Thus, the pixel electrode 77 is electrically connected with the data electrode 74.

In the related art structure, the open region of the contact hole for the electric connection between the data electrode 74 and the pixel electrode 77 is determined depending on an etching area in the first, second and third passivation layers 54, 55 and 56. Especially, the open region of the contact hole for the electric connection between the data electrode 74 and the pixel electrode 77 is largely determined depending on the etching area of the second passivation layer 55.

Accordingly, the exposed region of the data electrode 74 is reduced so that a contact region between the data electrode 74 and the pixel electrode 77 is also reduced, to thereby deteriorate contact efficiency.

During photolithography for etching the third passivation layer 56 after the second passivation layer 55, there might be an alignment failure and a contact failure caused by foreign matters.

In the LCD device with a built-in touch screen according to the related art having the above structure, the common electrode 75 serves as a touch-sensing electrode for a non-display mode, thereby sensing a capacitance (Ctc) based on a user's touch, and detecting a touch point through the sensed capacitance.

The LCD device with a built-in touch screen according to the related art is formed in such a way that the common electrode 75 is arranged in each individual pixel, and the respective common electrodes 75 are electrically connected with each other by the use of conductive line 76.

Accordingly, the process of forming the common electrode 75 is separately carried out from the process of forming the conductive line 76, whereby the manufacturing cost is increased and the yield is deteriorated due to the complicated manufacturing process.

Amorphous silicon (a-Si) TFT has disadvantages of low driving speed, and limitation in design of fine line width. In order to overcome these disadvantages, the elements of the lower substrate 505 (for example, TFT) may be formed of low-temperature poly silicon (LTPS).

If the elements of the lower substrate 505 (for example, TFT) are formed of low-temperature poly silicon (LTPS), as shown in FIG. 3, the process inevitably uses 10 masks. Also, plural processes (for example, 155 steps) are carried out by using 10 masks.

Especially, the respective processes for forming the common electrode 75 and the conductive line 76 uses additional masks ('mask 7' is used for formation of the common electrode, and 'mask 8' is used for formation of the conductive line), whereby plural processes are carried out.

As mentioned above, the low-temperature amorphous silicon (LTPS) facilitates to realize high resolution as compared to the amorphous silicon (a-Si), and also facilitates to obtain the good TFT-operation properties. However, in comparison to using the amorphous silicon (a-Si), the increased number of mask processes causes the complicated manufacturing process, to thereby deteriorate price competition and efficiency.

SUMMARY OF THE INVENTION

Accordingly, the present invention is directed to an LCD device with a built-in touch screen and a method for manufacturing the same that substantially obviates one or more problems due to limitations and disadvantages of the related art.

An aspect of the present invention is to provide an LCD device with a built-in touch screen, which enhances driving efficiency by using a lower substrate of low-temperature poly silicon (LTPS), and a method for manufacturing the same.

Another aspect of the present invention is to provide an LCD device with a built-in touch screen, which reduces a manufacturing cost by reducing the number of masks for a process of forming a lower substrate, and a method for manufacturing the same.

Another aspect of the present invention is to provide an LCD device with a built-in touch screen, which enhances manufacturing efficiency by simplifying a manufacturing process of a lower substrate, and a method for manufacturing the same.

Another aspect of the present invention is to provide an LCD device with a built-in touch screen, which enhances contact efficiency by increasing a contact between a data electrode and a pixel electrode on a lower substrate, and a method for manufacturing the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device with a built-in touch screen comprising a substrate having a pixel region, a thin film transistor formed at the pixel region, the thin film transistor including at least an active layer, a gate electrode, an insulating layer, and a data electrode, a first passivation layer formed on the thin film transistor, a first contact hole formed through a portion of the first passivation layer to expose the data electrode, a common electrode formed on at least one portion of the first passivation layer including inside the first contact hole, the common electrode operable to sense touch, a conductive line formed on at least one portion of the first passivation layer including inside the first contact hole, second passivation layer formed on the common electrode and the conductive line, a second contact hole formed through a portion of the second passivation layer to expose the conductive line corresponding to the data electrode, and a pixel electrode electrically connected with the conductive line, the pixel electrode formed on the second passivation layer and inside the second contact hole, wherein the data electrode and the pixel electrode are electrically connected via the common electrode and the conductive line.

In another aspect of the present invention, there is provided a method for manufacturing a liquid crystal display device with a built-in touch screen comprising the steps of forming a substrate having a pixel region, forming a thin film transistor at the pixel region, the thin film transistor including at least an active layer, a gate electrode, an insulating layer, and a data electrode, forming a first passivation layer on the thin film transistor, forming a first contact hole through a portion of the first passivation layer to expose the data electrode, forming a common electrode on at least one portion of the first passivation layer including inside the first contact hole, the common electrode operable to sense touch, forming a conductive line on at least one portion of the first passivation layer including inside the first contact hole, forming a second passivation layer on the common electrode and the conductive line, forming a second contact hole through a portion of the second passivation layer to expose the conductive line corresponding to the data electrode; and forming a pixel electrode electrically connected with the conductive line, the pixel electrode being on the second passivation layer and inside the second contact hole, wherein the data electrode and the pixel electrode are electrically connected via the common electrode and the conductive line.

In another aspect of the present invention, there is provided a method for manufacturing a liquid crystal display device with a built-in touch screen comprising the steps of forming a thin film transistor including an active layer, a gate electrode, an insulating layer, and a data electrode in each pixel region of a substrate, forming a first contact hole to expose the data electrode by forming a first passivation layer on the thin film transistor, and partially etching the first passivation layer, forming a common electrode and a conductive line on the first passivation layer and inside the first contact hole by photolithography, etching, and ashing processes using a mask, wherein the common electrode is connected with the conductive line, forming a second contact hole to expose the conductive line corresponding to the data electrode by forming a second passivation layer on the common electrode and the conductive line, and partially etching the second passivation layer, and forming a pixel electrode on the second passivation layer and inside the second contact hole, the pixel electrode electrically connected with the conductive line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a method for manufacturing an LCD device with a built-in touch screen according to the embodiment of the present invention.

DETAILED DESCRIPTION OF THE INVENTION

Figure 1:
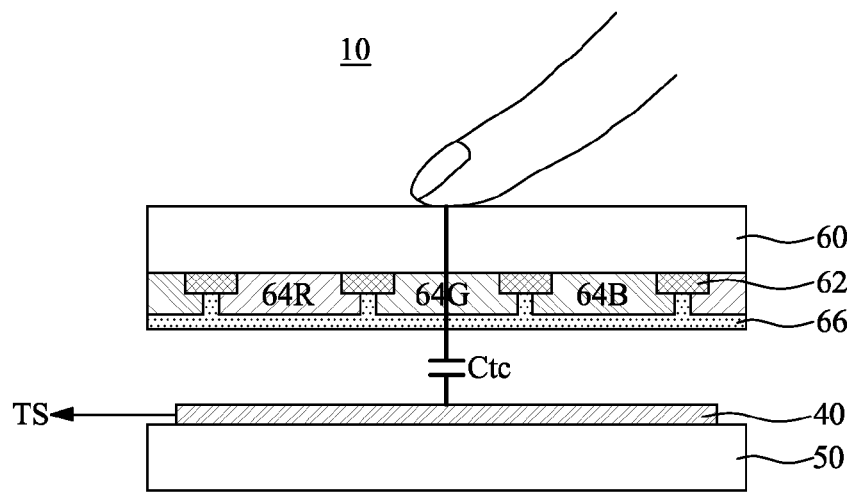
FIG. 1 illustrates an LCD device with a built-in touch screen according to the related art, and a method for manufacturing the same.
Figure 2:
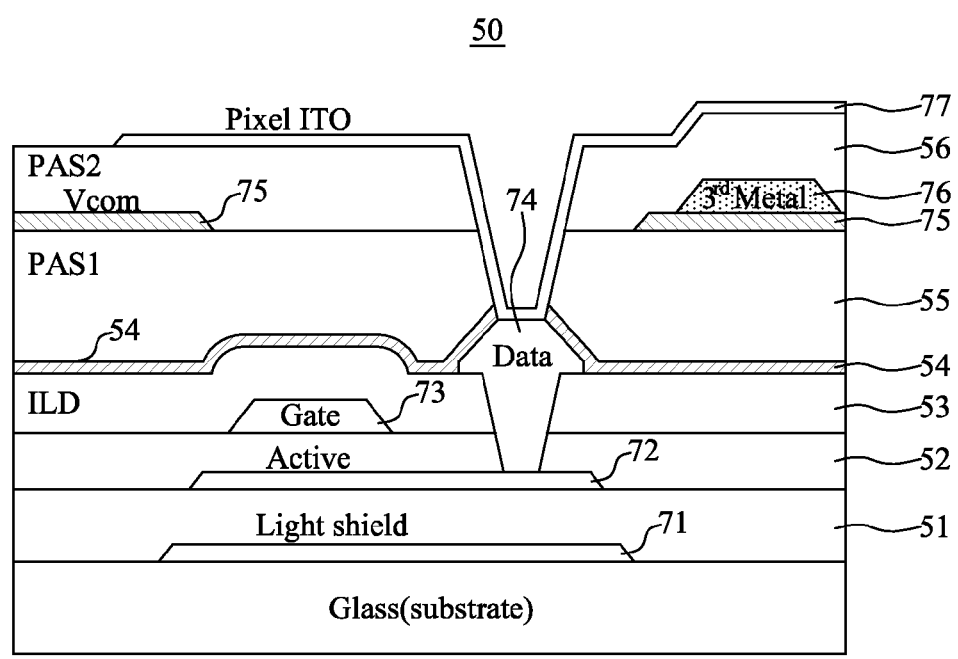
FIG. 2 is a cross section view illustrating a lower substrate in an LCD device with a built-in touch screen according to the related art.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device with a built-in touch screen according to the present invention and a method for manufacturing the same will be described with reference to the accompanying drawings.

For the following description of the embodiments of the present invention, if a first structure (for example, electrode, line, layer, contact, and etc.) is described as being formed "on" or "under" a second structure, the first and second structures may come in contact with each other, or there may be a third structure interposed between the first and second structures.

Depending on an alignment mode of the liquid crystal layer, an LCD device may be classified into Twisted-Nematic (TN) mode, Vertical-Alignment (VA) mode, In-Plane Switching (IPS) mode, and Fringe Field Switching (FFS) mode.

In case of the IPS mode and the FFS mode, both a pixel electrode and a common electrode are formed on a lower substrate, whereby liquid crystal molecules of the liquid crystal layer are aligned depending on an electric field between the pixel electrode and the common electrode. Especially, in the IPS mode, the pixel electrode and the common electrode are alternately arranged in parallel so that an In-Plane mode electric field occurs between the pixel electrode and the common electrode, thereby aligning the liquid crystal molecules of the liquid crystal layer.

However, in the IPS mode, the liquid crystal molecules are not properly aligned above the pixel electrode and the common electrode, whereby light transmittance is relatively deteriorated above the pixel electrode and the common electrode.

In order to overcome this problem of the IPS mode, the FFS mode has been proposed. In the FFS mode, an insulating layer is interposed between the pixel electrode and the common electrode.

In this case, any one of the pixel electrode and the common electrode is formed in a plate shape or pattern, and the other is formed in a finger shape, whereby a fringe field occurs between the pixel electrode and the common electrode. Thus, the liquid crystal molecules of the liquid crystal layer are aligned by the fringe field occurring between the pixel electrode and the common electrode.

The LCD device with a built-in touch screen according to the embodiment of the present invention is formed in the FFS mode.

The LCD device with a built-in touch screen according to the embodiment of the present invention comprises an in-cell touch type liquid crystal panel with a built-in touch screen for detection of a user's touch point; a backlight unit for supplying light to the liquid crystal panel; and a driving circuit.

The driving circuit includes a timing controller (T-con), a data driver (D-IC), a gate driver (G-IC), a touch-sensing driver, a backlight driver, and a power supplier.

The driving circuit may be totally or partially formed in Chip-On-Glass (COG) or Chip-On-Film (COF, Chip On Flexible Printed Circuit).

The liquid crystal panel includes lower and upper substrates bonded to each other with the liquid crystal layer interposed therebetween. Also, plural pixels arranged in a matrix configuration are formed in the liquid crystal panel.

The liquid crystal panel controls the transmittance of light passing through the liquid crystal layer in each pixel depending on a data voltage, to thereby display an image according to a video signal. Also, the common electrode on the lower substrate may be driven as the sensing electrode to sense the change of capacitance depending on the user's touch, whereby the user's touch point can be detected through the capacitance sensed by the common electrode.

On the upper substrate, there are a black matrix (BM); red, green, and blue color filters; and an overcoat layer. In this case, the black matrix defines a pixel region corresponding to each of plural pixels. Also, the red, green, and blue color filters are respectively formed in the respective pixel regions defined by the black matrix. The overcoat layer covers the red, green, and blue color filters and the black matrix, to thereby planarize the upper substrate.

On the lower substrate, there is a pixel array including plural pixels to drive the liquid crystal layer and detect the touching point by sensing the capacitance depending on the user's touch.

The pixel array includes a thin film transistor to be described; the common electrode; and a conductive line ($3^{rd}$ metal) for connection of the common electrodes in the respective pixels. The lower and upper substrates are bonded to each other by the use of sealant. Also, a display region (active region) of the liquid crystal panel is shielded by the sealant.

Although not shown in the lower substrate, gate and data lines crossing each other are formed to define the plurality of pixels.

A thin film transistor (TFT) is formed in each pixel, wherein the TFT serves as a switching element. The pixel electrode, which is electrically connected with the TFT, is formed in each of the plural pixels.

At this time, the TFT includes a gate electrode, an active layer (semiconductor layer), an insulating layer, and a data electrode (source or drain electrode). The TFT may be formed in a bottom gate structure where the gate electrode is positioned below the active layer. Selectively, the TFT may be formed in a top gate structure where the gate electrode is positioned above the active layer.

Figures 3, 4:
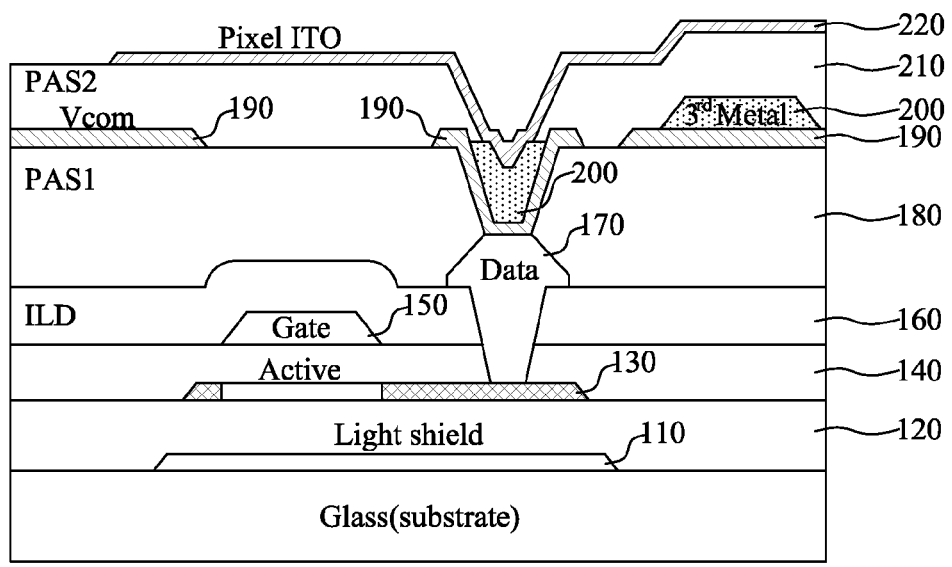
FIG. 3 illustrates a method for manufacturing an LCD device with a built-in touch screen according to the related art.
FIG. 4 illustrates a lower substrate in an LCD device with a built-in touch screen according to the embodiment of the present invention.

FIG. 4 illustrates a lower substrate in an LCD device with a built-in touch screen according to the embodiment of the present invention. In the LCD device with a built-in touch screen according to the embodiment of the present invention, the lower substrate may be formed of low-temperature poly silicon (LTPS).

Referring to FIG. 4, plural pixels are formed on the lower substrate 100.

Each pixel includes a TFT comprising a gate electrode 150, a data electrode 170, and an insulating layer; a pixel electrode (pixel ITO) 220 connected with the TFT to supply a pixel voltage according to a video signal; a common electrode 190 for supply of a common voltage (Vcom) to the pixel; and a conductive line 200 for connection of the common electrodes 190 in the respective pixels.

At this time, the conductive line 200 functions as a contact line which makes the common electrode 190 driven as a touch-sensing electrode to detect a user's touch point.

In more detail, each pixel of the lower substrate 100 includes a light-shielding layer 110 preventing light from being incident on an active layer (semiconductor layer) 130; a buffer layer 120 on the light-shielding layer 110; the active layer 130 on the buffer layer 120; a gate insulating layer (GI) 140 on the active layer 130; and the gate electrode 150 partially overlapped with the active layer 130 and formed of metal on the gate insulating layer 140.

There are an interlayer dielectric (ILD) 160 and the data electrode 170. The interlayer dielectric 160 is formed on the gate electrode 150, to thereby insulate the gate electrode 150 from the data electrode 170. The data electrode 170 is electrically connected with the active layer 130, wherein the active layer 130 is partially exposed by a trench.

The trench is formed by etching predetermined portions of the gate insulating layer 140 and the interlayer dielectric 160, whereby the trench exposes the predetermined portion of the active layer 130.

The data electrode 170 is formed by burying a metal material in the trench. The data electrode 170 is electrically connected with the pixel electrode 220 via the common electrode 190 and the conductive line 200.

In each pixel of the lower substrate 100, there are a first passivation layer (PAS1) 180, the common electrode 190, and the conductive line 200. The first passivation layer (PAS1) 180 is formed to cover the gate electrode 150 and the data electrode 170. The common electrode 190 is formed on an upper portion of the first passivation layer 180, and is brought into contact with the data electrode 170, wherein the common electrode 190 is formed of a transparent conductive material such as Indium-Tin-Oxide (ITO). The conductive line 200 is formed on a predetermined portion of the common electrode 190, and is electrically connected with the common electrode 190.

At this time, the common electrode 190 and the conductive line 200 are formed by a mask process using a half-tone mask (HTM).

A first contact hole is formed by partially etching the first passivation layer 180 to expose an upper portion of the data electrode 170. Then, the common electrode 190 and the conductive line 200 are sequentially formed inside the first contact hole. Thus, the data electrode 170, the common electrode 190, and the conductive line 200 are electrically connected in the contact hole.

Each pixel of the lower substrate 100 includes a second passivation layer (PAS2) 210 to cover the common electrode 190 and the conductive line 200; and the pixel electrode 220 electrically connected with an upper portion of the second passivation layer 210 and the data electrode 170, wherein the pixel electrode 220 is formed of a transparent conductive material.

A second contact hole is formed by partially etching the second passivation layer 210 to expose the conductive line 200 connected with the data electrode 170. Then, the pixel electrode 220 is formed inside the second contact hole. Thus, the pixel electrode 220 is electrically connected with the data line 170 via the common electrode 190 and the conductive line 200.

In the LCD device with a built-in touch screen according to the embodiment of the present invention, during a display period of a frame, a data voltage is supplied to the pixel electrode 220, and a common voltage is supplied to the common electrode 200, to thereby display an image.

During a non-display period of a frame, the common electrode 190 formed in each pixel and connected by the conductive line 200 is driven as the touch-sensing electrode, to thereby detect the change of capacitance (Ctc) depending on the user's touch.

For this, the common electrode 190 supplies the common voltage to the pixel during a display period of a frame, and the common electrode 190 is driven as the touch-sensing electrode to detect the user's touch during a non-display period of a frame.

Depending on the user's touch, the touch capacitance is formed between the upper substrate and the common electrode 190 of the lower substrate. The touch point is detected by comparing the touch capacitance depending on the user's touch with a reference capacitance.

In the LCD device with a built-in touch screen according to the embodiment of the present invention, the data electrode 170 is exposed via the first contact hole formed by etching the first passivation layer 180 of the lower substrate 100.

The common electrode 190 and the conductive line 200 are simultaneously formed inside the first contact hole by one mask process using one half-tone mask, wherein the first contact hole is formed by partially etching the first passivation layer 180. Thus, the pixel electrode 220 is brought into contact with the data electrode 170 via the common electrode 190 and the conductive line 200.

At this time, the common electrode 190 and the conductive line 200, which are formed inside the first contact hole to expose the upper portion of the data electrode 170, are used for the contact between the data electrode 170 and the pixel electrode 220.

The common electrode formed in the first contact hole is electrically insulated from the common electrode formed on the first passivation layer 180.

The additional common voltage is not applied to the common electrode 190 formed in the first contact hole. Meanwhile, during a display period of a frame, the common voltage is applied to the common electrode formed on the first passivation layer 180.

In the LCD device with a built-in touch screen according to the embodiment of the present invention is formed in such a way that the first passivation layer (PAS0) is removed from the interlayer dielectric of the related art, and the common electrode 190 and the conductive line 200 are simultaneously formed by one half-tone mask. Thus, the LCD device with a built-in touch screen according to the embodiment of the present invention can ensure a sufficient align margin during the following process for forming the second passivation layer (PAS2) 210.

Accordingly, a sufficient contact area between the data electrode 170 and the pixel electrode 220 can be ensured through a sufficient size of the second contact hole formed by etching the second passivation layer (PAS2) 210, to thereby enhance contact efficiency between the data electrode 170 and the pixel electrode 220.

Also, it is possible to reduce contact failures caused by foreign matters during a manufacturing process for the contact between the data electrode 170 and the pixel electrode 220, thereby improving driving efficiency of the LCD device owing to the improved contact structure between the data electrode 170 and the pixel electrode 220.

A method for manufacturing the LCD device with a built-in touch screen according to the embodiment of the present invention will be described with reference to FIGS. 5 to 9.

As shown in FIG. 5, the conductive line 200 for connecting the common electrode 190 of the lower substrate 100 with the common electrode 190 of each pixel may be formed by one mask process using one half-tone mask.

In comparison to the related art, the number of masks used for the manufacturing process is reduced, whereby the accompanying processes are decreased. Also, the manufacturing process of the present invention is simplified since the process of removing the related art first passivation layer (PAS0) is omitted.

As shown in FIG. 6A, a light-shielding material such as a metal material is formed on a substrate. Then, the light-shielding material is patterned by photolithography and wet-etching processes using a mask, to thereby form the light-shielding layer 110. The light-shielding layer 110 is aligned with the active layer 130 formed by the following process.

Figure 6:
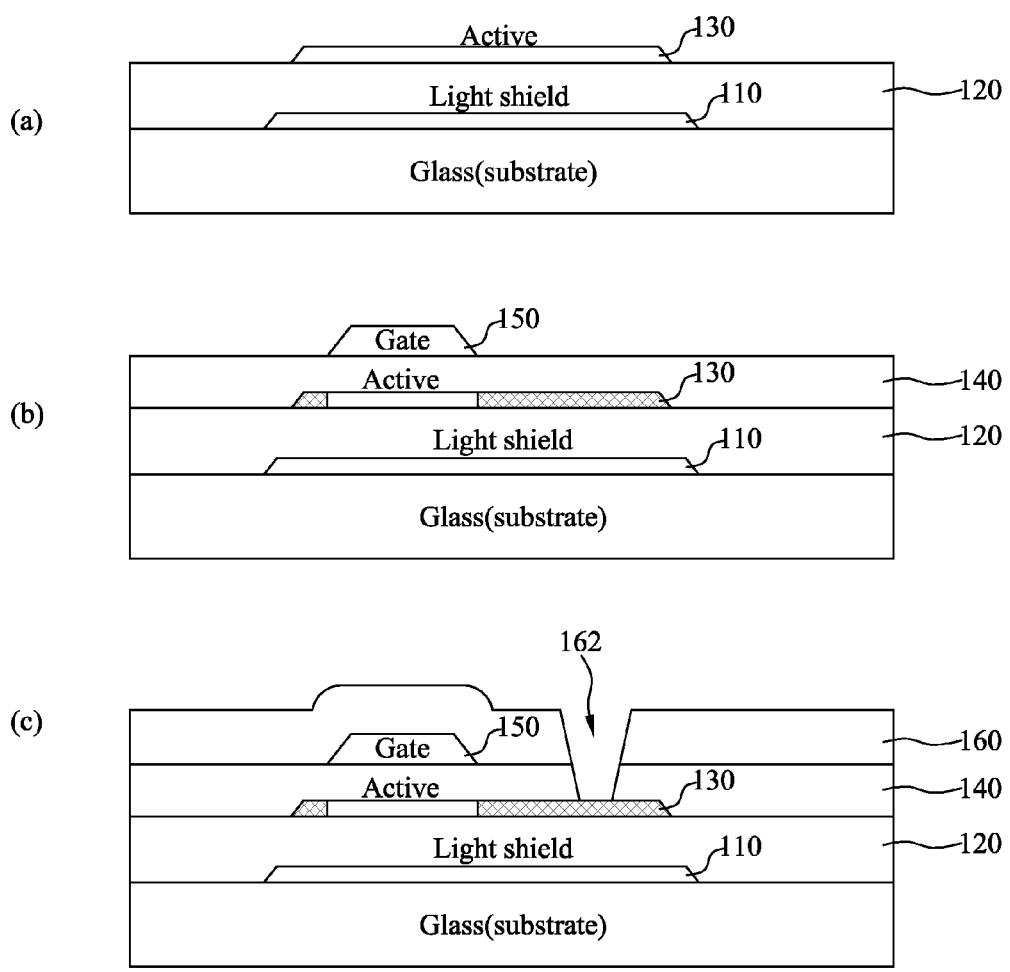
FIGS. 6A-6C illustrate a method for manufacturing an LCD device with a built-in touch screen according to the embodiment of the present invention.

The substrate may be formed of transparent glass or transparent plastic. FIG. 6 shows an exemplary case using the glass substrate.

After that, the buffer layer 120 is formed to cover the light-shielding layer 110, and amorphous silicon (a-Si) is deposited on the buffer layer 120, to thereby form the semiconductor layer. Then, the semiconductor layer is patterned by photolithograph and dry-etching process using a mask, to thereby form the active layer 130. The active layer 130 is aligned with the light-shielding layer 110 at one side of the substrate.

As shown in FIG. 6B, TEOS (Tetra Ethyl Ortho Silicate) or MTO (Middle Temperature Oxide) may be deposited on an entire surface of the substrate by CVD (Chemical Vapor Deposition), thereby forming the gate insulating layer 140.

Then, a metal material is deposited on the gate insulating layer 140 while being overlapped with the active layer 130. Then, the gate electrode 150 is formed by photolithography and etching process using a mask, and the gate electrode 150 is lightly doped with N-type dopant (N).

When forming the gate electrode 150, the wet-etching and dry-etching processes are carried out. Between the wet-etching process and the dry-etching process, the active layer 130 is heavily doped with N-type dopant ($N^+$). According as the gate electrode 150 is formed on the active layer 130, the predetermined region of the active layer 130, which is not overlapped with the gate electrode 150, is heavily doped with N-type dopant ($N^+$).

As shown in FIG. 6C, an insulating material is deposited on the substrate, whereby the gate electrode 150 and the gate insulating layer 140 are covered with the insulating material, which forms the interlayer dielectric 160 to insulate the gate electrode 150 with the other elements of the lower substrate.

Then, photolithography and dry-etching processes using a mask is applied to the predetermined portion of the interlayer dielectric 160 partially overlapped with the active layer 130, and the predetermined portion of the gate insulating layer 140, to thereby form the trench 162 exposing the upper portion of the active layer 130.

As shown in FIG. 7A, a metal material is deposited on the entire surface of the substrate and inside the trench 162 (wherein, the metal material is buried in the trench 162). After that, the data electrode 170 is formed by photolithograph and wet-etching processes using a mask.

Inside the trench 162, the data electrode 170 is electrically connected with the active layer 130.

As shown in FIG. 7B, the first passivation layer (PAS1) 180 is formed to cover the interlayer dielectric 160 and the data electrode 170. Then, the first contact hole 182 for exposing the data electrode 170 is formed by photolithography and etching process using a mask.

Then, a transparent conductive material and a metal material are sequentially deposited on the first passivation layer (PAS1) 180 and inside the first contact hole 182.

As shown in FIG. 7C, the common electrode 190 and the conductive line 200 are formed on the predetermined portion of the first passivation layer (PAS1) 180 and inside the first contact hole 182 by photolithography, etching, and ashing processes using a half-tone mask. That is, only one mask is used to form the common electrode 190 and the conductive line 200 at the same time.

The common electrode 190 is electrically connected with the conductive line 200. During a display period of a frame, the common voltage (Vcom) is supplied to the common electrode 190 formed on the first passivation layer (PAS1) 180.

Meanwhile, the common electrode 190 formed inside the first contact hole 182 serves as the contact electrode to electrically connect the data electrode 170 with the pixel electrode 220 to be described, whereby the common voltage (Vcom) is not supplied to the common electrode 190 formed inside the first contact hole 182.

Hereinafter, a detailed method for forming the common electrode 190 and the conductive line 200 by the use of a half-tone mask will be explained in detail as follows.

As shown in FIG. 8A, ITO (Indium-Tin-Oxide) and metal material are sequentially deposited on the predetermined structure (for example, first passivation layer PAS1, 180), to thereby form an ITO layer 192 and metal layer 202 in sequence.

Then, a photoresist layer 230 (hereinafter, referred to as 'PR layer') is formed by coating photoresist, and more particularly, photoacryl onto the metal layer 202.

As shown in FIG. 8B, a photoresist pattern 232 (hereinafter, referred to as 'PR pattern') having an uneven pattern ( 凹凸 ) is formed on the metal layer 202 by photolithography using the half-tone mask 240. That is, the PR layer 230 is irradiated with the light by the use of half-tone mask 240, to thereby form the plurality of PR patterns 232 used as the mask for forming the common electrode 190 and the conductive line 200.

The half-tone mask 240 includes a non-transmission region through which light is not transmitted; a semi-transmission region through which light is partially transmitted; and a transmission region through which light is transmitted. Thus, since the PR layer 230 is patterned by the use of half-tone mask 240, it enables to form the plural PR patterns 232 with the different widths and thicknesses.

If using the half-tone mask 240, the PR layer 230 corresponding to the non-transmission region remains as it is; the PR layer 230 corresponding to the semi-transmission region remains partially; and the PR layer 230 corresponding to the transmission region is removed completely.

For example, the plural PR patterns 232 may be formed when light of 50 mJ~100 mJ luminous exposure is applied to the PR layer 230. That is, the PR pattern of the non-transmission region has 'h1' height of 1.5~3.0 μm; and the PR pattern of the semi-transmission region has 'h2' height of 0.2~1.0 μm.

Among the plural PR patterns, a width(a) of the first PR pattern and a width(b) of the second PR pattern are designed within a range of 2~5 μm. The width(a) of the first PR pattern may be different from the width(b) of the second PR pattern. For obtaining straightness of the line, the width(a) of the first PR pattern is relatively small, and the width(b) of the second PR patter is relatively large.

As shown in FIG. 8C, the metal layer 202 is first ashed by using the plural PR patterns 232 as a mask, to thereby form a metal pattern 204. A critical dimension 'c' of the PR pattern 232 and metal pattern 204 formed by the first etching may be not more than 0.5 μm.

As shown in FIG. 8D, after ashing the plural PR patterns 232, the ITO layer 192 is etched under the circumstance that the metal pattern 204 is used as the mask, to thereby form an ITO pattern 194. At this time, when etching the ITO layer 192, an organic film may be damaged by plasma, that is, photoacryl may be damaged by plasma. Thus, when the liquid crystal panel is driven, stains might occur due to the damaged photoacryl. To prevent the stains, the ashing process of the PR pattern 232 may be carried out before the etching process of the ITO layer 192.

As shown in FIG. 8E, the metal pattern 204 formed by the first etching of the metal layer 202 is secondly etched under the circumstance that the PR pattern remaining after the ashing process of the PR pattern 232 is used as the mask. At this time, a critical dimension 'd' of the PR pattern 232 and metal pattern 204 formed by the second etching may be not more than 0.5 μm.

As shown in FIG. 8F, the common electrode 190 of the ITO is formed by ashing the PR pattern 232 remaining on the substrate, and the conductive line 200 is formed of the metal material.

Figure 7:
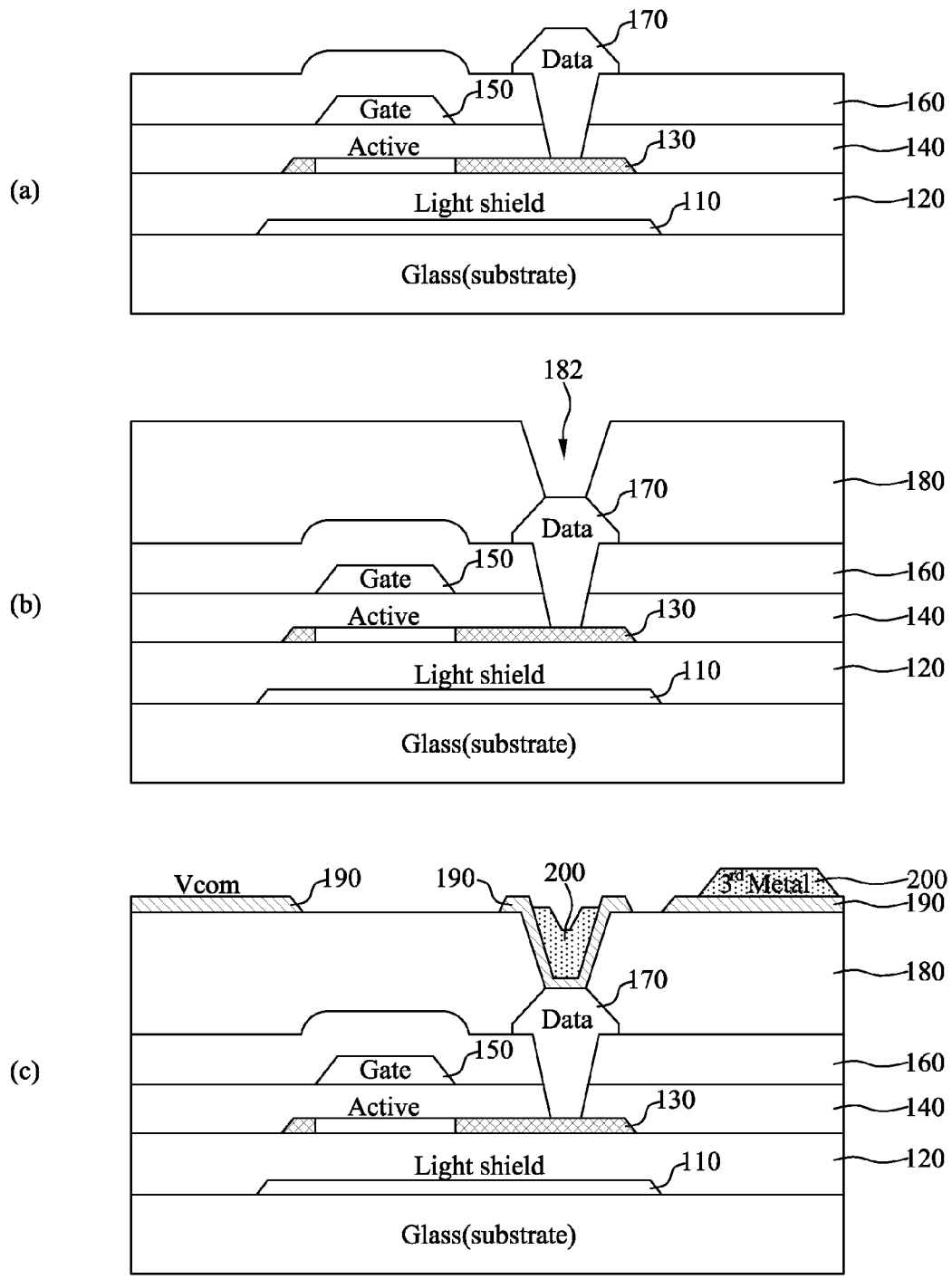
FIGS. 7A-7C illustrate a method for manufacturing an LCD device with a built-in touch screen according to the embodiment of the present invention.

As shown in FIG. 7, the common electrode 190 and the conductive line 200 are simultaneously formed inside the first contact hole 182 for exposing the upper portion of the first passivation layer (PAS1) 180 and the data electrode 170.

Figure 8:
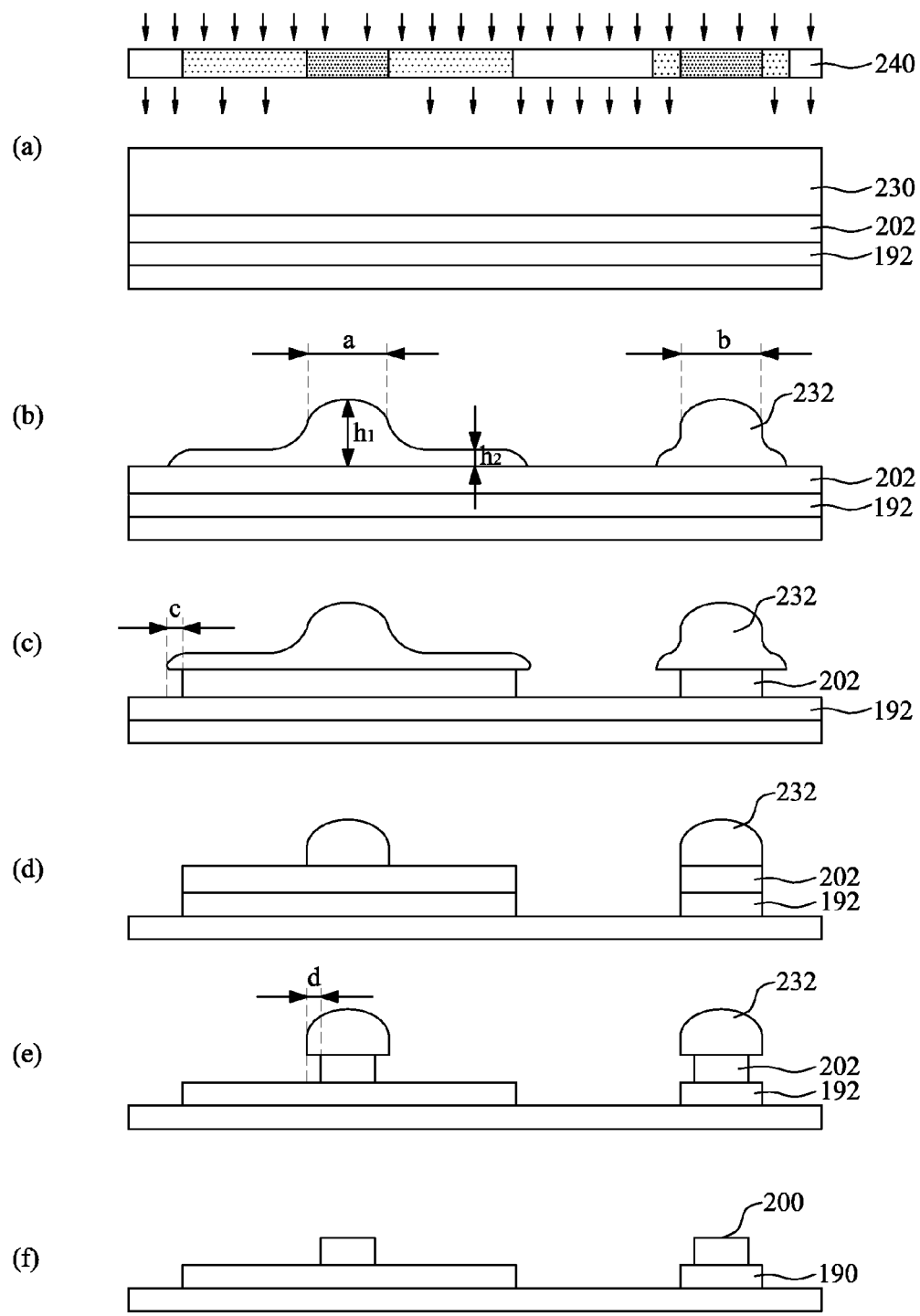
FIGS. 8A-8F illustrate a method for manufacturing an LCD device with a built-in touch screen according to the embodiment of the present invention.
Figure 9:
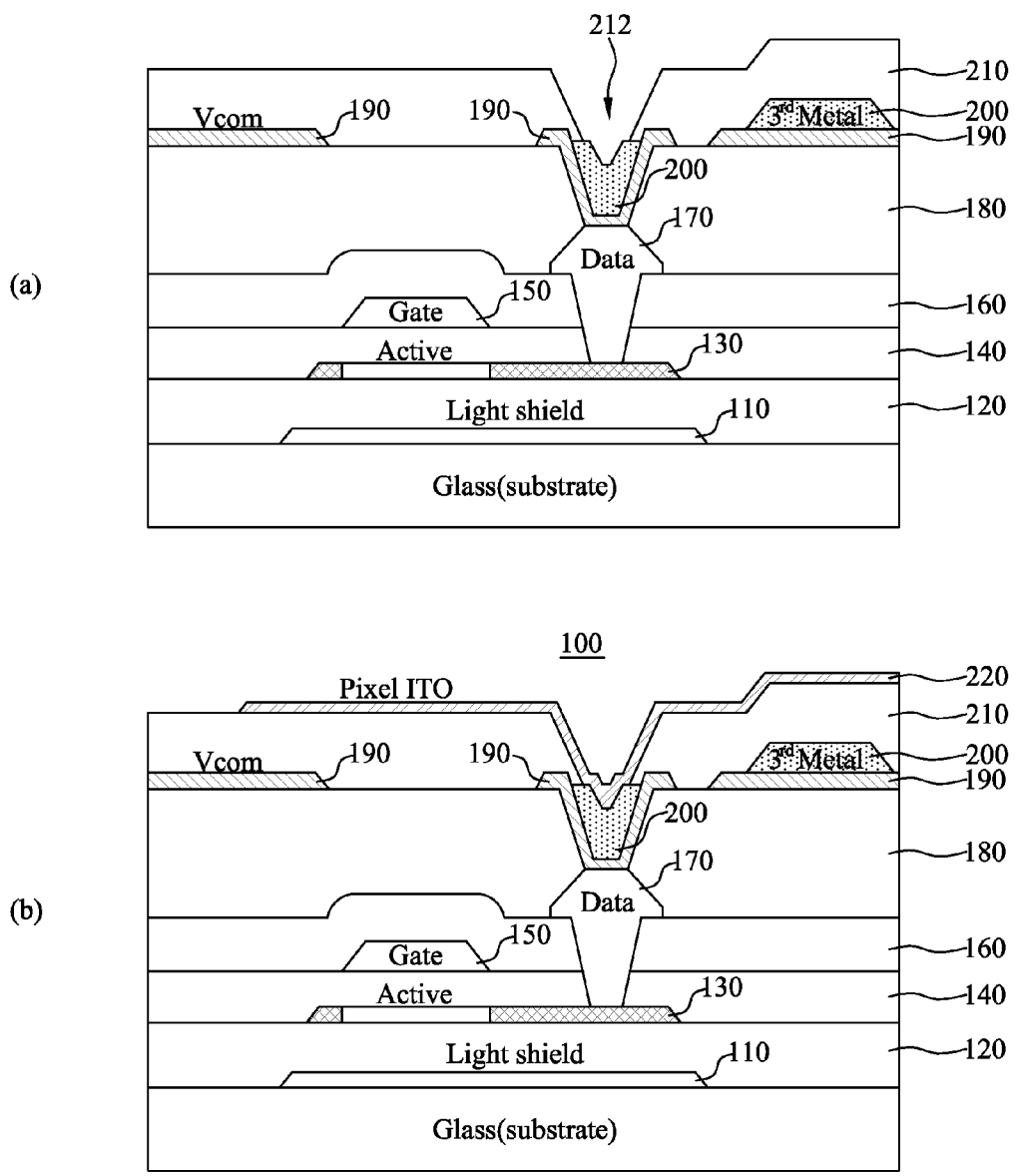
FIGS. 9A-9B illustrate a method for manufacturing an LCD device with a built-in touch screen according to the embodiment of the present invention.

Referring to FIG. 8, the common electrode 190 and the conductive line 200 are simultaneously formed by the mask process using one half-tone mask.

As shown in FIG. 9A, the second passivation layer (PAS2) 210 is formed on the first passivation layer (PAS1) 180, to thereby cover the common electrode 190 and the conductive line 200.

Then, the second contact hole 212 is formed in the predetermined portion of the second passivation layer (PAS2) 210 by the photolithography and etching process using the mask. At this time, the second contact hole 212 is formed in the region corresponding to the data electrode 170, wherein the second contact hole 212 exposes the conductive line 200 electrically connected with the data electrode 170.

As shown in FIG. 9B, the pixel electrode 220 of the transparent conductive material such as ITO is formed on the second passivation layer (PAS2) 210 and is also formed inside the second contact hole 212.

Inside the second contact hole 212, the pixel electrode 220 is electrically connected with the conductive line 200. Thus, the data electrode 170 is electrically connected with the pixel electrode 220 via the common electrode 190 and the conductive line 200 formed inside the first contact hole 182.

For the above explanation, the active layer is doped with N-type dopant, but not necessarily. According to another embodiment of the present invention, the active layer may be doped with P-type dopant.

The number of masks used in the above method for manufacturing the LCD device with a built-in touch screen according to the embodiment of the present invention is smaller that the number of masks used in the related art method by one mask. In comparison to the related art method, the accompanying processes in the above method for manufacturing the LCD device with a built-in touch screen according to the embodiment of the present invention is decreased by 7.7% (while the related art method requires 155 steps, the method of the present invention requires 143 steps), whereby the method for manufacturing the LCD device with a built-in touch screen according to the embodiment of the present invention enables the reduced manufacturing cost and improved manufacturing efficiency.

In the LCD device with a built-in touch screen according to the embodiment of the present invention and the method for manufacturing the same, the common electrode 190 and the conductive line 200 are simultaneously formed by using one half-tone mask, to thereby ensure the align margin for the following process.

In the LCD device with a built-in touch screen according to the embodiment of the present invention and the method for manufacturing the same, the driving efficiency is improved owing to the enhanced contact efficiency between the data electrode 170 and the pixel electrode 220 on the lower substrate 100.

In the LCD device with a built-in touch screen according to the embodiment of the present invention and the method for manufacturing the same, the lower substrate 100 is formed of low-temperature poly silicon (LTPS), thereby improving the driving efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device with a built-in touch screen, comprising:
   a substrate having a pixel region;
   a thin film transistor formed at the pixel region, the thin film transistor including at least an active layer, a gate electrode, an insulating layer, and a data electrode;
   a first passivation layer formed on the thin film transistor;
   a first contact hole formed through a portion of the first passivation layer to expose the data electrode;
   a common electrode formed on at least one portion of the first passivation layer, the common electrode being operable to sense touch;
   an another common electrode formed inside the first hole, the another common electrode being electrically insulated from the common electrode, the another common electrode comprising a same material as the common electrode;
   a conductive line formed on the common electrode;
   an another conductive line formed inside and partially filling the first hole, the another conductive line being electrically insulated from the conductive line and the common electrode, the another conductive line having a top below the level of the common electrode, the another conductive line comprising a same material as the conductive line;
   a second passivation layer formed on the common electrode and the conductive line;
   a second contact hole formed through a portion of the second passivation layer to expose the another conductive line corresponding to the data electrode; and
   a pixel electrode formed on the second passivation layer and inside the second contact hole,
   wherein the data electrode and the pixel electrode are electrically connected via the another common electrode and the another conductive line.

2. The liquid crystal display device according to claim 1, wherein the common electrode and the conductive line are formed by a mask process using a half-tone mask.

3. The liquid crystal display device according to claim 1, wherein the thin film transistor is formed of low-temperature poly silicon (LTPS).

4. The liquid crystal display device according to claim 1, wherein the conductive line connects to the common electrode in the pixel region.

5. The liquid crystal display device according to claim 1, wherein the common electrode senses touch during a non-display period and supplies a common voltage during a display period of the liquid crystal display device.

6. The liquid crystal display device according to claim 1, wherein the first contact hole is formed by etching a predetermined portion of the first passivation layer.

7. The liquid crystal display device according to claim 1, wherein the second contact hole is formed by etching a predetermined portion of the second passivation layer.

8. The liquid crystal display device according to claim 1, wherein the another conductive line is formed on the another common electrode inside the first contact hole.

* * * * *